United States Patent [19]

Hess

[11] 4,373,968

[45] Feb. 15, 1983

[54] COATING COMPOSITION

[75] Inventor: Susan V. Hess, Norristown, Pa.

[73] Assignee: Amchem Products, Inc., Ambler, Pa.

[21] Appl. No.: 276,881

[22] Filed: Jun. 24, 1981

[51] Int. Cl.$^3$ .............................................. C23F 7/24
[52] U.S. Cl. .................................... 148/6.2; 148/6.16
[58] Field of Search ................................ 148/6.2, 6.16

[56] References Cited

U.S. PATENT DOCUMENTS 3,036,934  5/1962  Horton ................................ 148/6.2
3,185,596  5/1965  Schiffman ........................... 148/6.2
4,183,772  1/1980  Davis .................................. 148/6.16

Primary Examiner—Sam Silverberg
Attorney, Agent, or Firm—Alexis Barron

[57] ABSTRACT

An acidic aqueous solution for coating metallic substrates and consisting essentially of hexavalent chromium, reduced chromium, an alkylphenoxypoly(alkyleneoxy)ether and dispersed acrylic resin solids.

23 Claims, No Drawings

COATING COMPOSITION

FIELD OF THE INVENTION

This invention relates to the application to metallic substrates of coatings which are corrosion-resistant and to which overlying coatings, such as those formed from paints, satisfactorily adhere.

It is known to coat metallic surfaces with coating compositions that are effective in forming thereon coatings which are corrosion-resistant in order to protect the surfaces from materials which tend to corrode or otherwise degrade the metallic surfaces. In general, such coatings should also have properties such that overlying coatings which are applied thereto adhere tightly. The overlying coatings are generally decorative and/or functional in nature and are typically formed from materials, such as, for example, paints, lacquers, and inks. Such coatings are often termed "siccative coatings". The aforementioned corrosion-resistant and adherent properties are generally evaluated by subjecting the coated article to tests which involve a determination of the salt spray resistance, impact resistance, and flexibility properties of the article and the degree to which the siccative coating adheres to the underlying coating.

One of the many types of coating compositions that are available for forming on metallic substrates coatings of the aforementioned type comprises an acidic aqueous coating solution containing hexavalent chromium, reduced chromium and acrylic resin. It is to this general class of coating compositions that the present invention relates.

REPORTED DEVELOPMENTS

Acidic aqueous coating compositions which include dissolved hexavalent and reduced forms of chromium and acrylic resin have been used commercially for many years. The coating composition disclosed in U.S. Pat. No. 3,185,596 to Schiffman, and assigned to the same assignee as the present invention, is of the aforementioned type. This patent discloses an acidic aqueous composition formulated from: (A) the reaction product of chromic acid ($CrO_3$) and formaldehyde (reducing agent) in an amount such that about 40 to about 95 wt.% of the chromium remains in the hexavalent form with the balance of the chromium being in reduced form; and (B) an acrylic resin in the form of a water-soluble resin or in the form of dispersed resin solids. The patent discloses the use of poly(acrylic acid) and alkali metal and ammonium salts, and esters thereof. The patent also discloses the optional use of co-solvents, for example, aliphatic alcohols and ketones and aliphatic ether alcohols. It is known also to incorporate phosphoric acid into the composition.

In addition, the aforementioned '596 patent discloses the use in the coating composition of a wetting agent which aids in thoroughly wetting the surface to be coated. The patent refers generally to the use of cationic, anionic and nonionic wetting agents, and more specifically, to the use of polyethoxylated alkylphenols containing 6 to 12 ethylene groups and 8 to 9 carbon atoms in the alkyl group.

Another composition of the aforementioned type is disclosed in U.S. Pat. No. 4,183,772 to Davis, also assigned to the same assignee as the present invention. The composition is formulated from: (A) hexavalent chromium, 40 to 60 wt.% of which is in reduced form (trivalent chromium); (B) phosphoric acid; and (C) a mixture of (i) soluble poly(acrylic acid) and (ii) dispersed acrylic resin solids. The use of compositions including the aforementioned constituents in proportions, as taught in the '772 patent, is said to form coatings which have the advantage of unusually high performance levels irrespective of the type of overlying paint film that is applied to the coating. The '772 patent points out that coatings formed from compositions disclosed in the aforementioned '596 patent have a high performance level when used with vinyl paint, but not when used with polyester paint.

It is noted that compositions disclosed in each of the aforementioned patents can be used to form coatings that need not be covered with an overlying coating and that the compositions have the desirable characteristic of forming coatings on contact with metallic surfaces following drying—usually hot air or oven baking—and without the need of rinsing or squeegeeing the treated surface to remove excess coating composition. This is typically referred to as a "no waste" treatment which has economic as well as ecological benefits because effluents—toxic or otherwise—are not generated in the coating process.

Although compositions of the aforementioned type can be used to advantage in various types of applications, a problem has been encountered in the use of this type of composition when it is applied to the metallic surface by an applicator roll. It has been observed that use of the composition results in an accumulation of, and excess build-up of, chromium on the applicator roll. This causes undue wear of the applicator-roll and can affect adversely the appearance, as well as the functional quality of the coating. Cleaning the roll periodically of the chromium build-up is not attractive because of additional maintenance costs.

Accordingly, this invention relates to the provision of a coating composition of the aforementioned $Cr^{+6}$/reduced Cr-acrylic resin type which can be used to particular advantage in applications in which the composition is applied by roller coating techniques and which exhibits other desired properties that are expected of such compositions.

SUMMARY OF THE INVENTION

In accordance with this invention, there is provided, in a coating composition of the type which is effective in forming on a metallic surface a corrosion-resistant coating and which comprises an acidic aqueous coating solution containing hexavalent chromium, reduced chromium and dispersed acrylic resin solids, and of the type which, when applied to a substrate by an applicator roll, tends to deposit on the roll excessive amounts of chromium, the improvement comprising inclusion in the composition of an alkylphenoxypoly (alkyleneoxy) ether in an amount sufficient to deter said excessive chromium build-up.

It is noted that the prior art compositions of the type to which the present invention relates generally include surfactant in an amount effective to maintain the resin solids in their dispersed state. Typically, such compositions are formulated from the mixed chromium compounds ($Cr^{+6}$/reduced Cr) and an acrylic latex, that is, an aqueous composition including resin solids maintained in a dispersed state through the aid of a surfactant. The use of such prior art compositions results in the aforementioned chromium build-up problem. Accordingly, it should be understood that the present invention includes the use of surfactant in an amount over and above that which is necessary to maintain the resin particles in their dispersed state.

The use of an alkylphenoxypoly(alkyleneoxy)ether (for convenience, hereafter on occasion referred to as "ether surfactant") is effective in deterring chromium build-up on an applicator roll when the coating composition is applied by such means. In addition, it has been found that the adhesion of overlying coatings can be improved through the use of the ether surfactant of the present invention. And it should be appreciated also that other desirable properties that are associated with the class of compositions to which this invention relates are possessed by compositions within the scope of the present invention. In contrast, and as will be seen from comparative examples reported below, the use of other types of surfactants tends to cause adverse effects.

DETAILED DESCRIPTION OF THE INVENTION

With respect to the $Cr^{+6}$/reduced Cr constituent, it is obtained by reacting a hexavalent chromium compound or mixture of such compounds with a material that is effective in reducing some of the hexavalent chromium. Preferably, the partial reduction is effected by a reducing agent that does not form objectionable reaction products that are obtained in the composition. The coating composition should contain at least about 1 g/l of total chromium. Although an amount of total chromium corresponding to its solubility limit in the composition can be used, it is recommended that the amount of total chromium not exceed about 150 g/l. Preferably, the total chromium concentration in the composition comprises about 10 to about 50 g/l. Although various materials can be used to accomplish this, as is known in the art, it is preferred to use formaldehyde as the reducing agent, as disclosed in U.S. Pat. No. 3,063,877. For example, an aqueous concentrate of the composition is prepared by treating an aqueous solution of hexavalent chromium compound, preferably, an aqueous solution of chromic acid, with formaldehyde to reduce a portion of the hexavalent chromium. Examples of other soluble hexavalent chromium compounds that can be used are ammonium dichromate and alkali metal dichromates, for example, lithium dichromate, sodium dichromate, and potassium dichromate.

About 40 to about 60 wt.%, and preferably, about 44 to about 50 wt.% of the hexavalent chromium should be in reduced form. Suitable amounts of reducing agent can be used to reduce the desired amount of hexavalent chromium. In preparing an aqueous concentrate of $Cr^{+6}$/reduced Cr, it may be found that the concentrate tends to gel on standing. The tendency toward gel formation may be substantially eliminated by the addition of small amounts of phosphoric acid either before or after the concentrate is diluted. As little as about 0.05 ml of 75% $H_3PO_4$ solution (about 0.06 g of $H_3PO_4$) per gram of the total chromium (both $Cr^{+6}$ and reduced Cr) is usually sufficient to prevent such gelling. Higher amounts of $H_3PO_4$ can be used.

Another essential ingredient of the formulation of the present invention is acrylic resin in the form of dispersed solids. Such resins are well known and have been used for many years in prior art compositions of the type to which this invention relates, as disclosed in the aforementioned patents. The composition should include at least about 0.5 g/l of this constituent. The practical upper limit of this constituent is governed by the amount beyond which no appreciable improvement in properties is achieved as additional amounts of resin are included in the composition. Although this can vary, depending on the particular formulation involved, a recommended upper limit is about 75 g/l of acrylic resin solids. Preferably, the acrylic resin solids comprise about 5 to about 25 g/l of composition.

The composition can be formulated conveniently from a latex including the acrylic resin solids. A preferred latex is sold under the trademark Rhoplex AC-73, which is prepared by emulsion polymerization. The latex contains about 46–47 wt.% resin solids and has a pH of 9–10. It should be understood that other latices, including a mixture of different latices, can be used also.

The ether surfactant for use in the composition of this invention belongs to a class of known materials, including commercially available materials, and comprises an alkylphenoxypoly(alkyleneoxy)ether. The species of surfactant should be soluble or miscible in the composition in the amount used and should not cause the composition to destabilize. As will be seen from comparative examples below, the addition of various types of surfactants to coating compositions of the prior art cause precipitation of the resin solids. In contrast, the ether surfactant of the present invention does not cause such precipitation. The ether surfactant can include an alkyl group, straight or branched chain, having 1 to about 18 carbon atoms. The poly(alkyleneoxy) group typically comprises lower alkylene groups, preferably polyethylene groups, including up to an average of about 50 units. The preferred ether group is benzyl, but other groups can be used, including, for example, straight or branched chain alkyl groups having up to about 18 carbon atoms and phenyl. A modified polyethoxy adduct can be used also.

The composition should include at least about 0.03 g/l of the ether surfactant. A recommended upper limit for the surfactant is about 10 g/l inasmuch as it appears that for most applications such amount is effective in accomplishing the desired result. Preferably, the composition includes about 0.4 to about 7 g/l of the ether surfactant.

An optional, but nevertheless preferred, constituent of the composition is phosphoric acid. It functions to improve both the corrosion-resistant and adherency properties of the coating. The phosphoric acid can be used in an amount of about 0.06 to about 10 g/l of composition. The pH of the composition will generally be in the range of about 2.5 to about 3.4. Phosphoric acid can be used to adjust the pH.

In preparing the coating composition of the invention, it is preferred to use either deionized or distilled water in order to minimize the amount of salts deposited in the coating. This avoids or reduces the number of sites which are points of corrosion.

U.S. Pat. No. 4,183,772 has been referred to hereinabove. As mentioned briefly above, the coating composition disclosed in this patent is a particularly good one because it functions to form coatings which exhibit excellent properties irrespective of the type of overlying paint film that is applied to the coating. In effect, the coatings have generally a universal utility under a wide variety of paint systems and paint types, including, for example, vinyl, polyester, epoxy and acrylic paints. The ether surfactant of the present invention can be used in the compositions disclosed in the aforementioned '772 patent, the disclosure of which is incorporated herein by reference.

The composition of the present invention can be formulated according to known techniques. It is noted that special means of preparation are referred to in the aforementioned '772 patent for the compositions disclosed therein. Typical industry practice will generally involve the preparation of an aqueous concentrate including all constituents except the ether surfactant of the present invention, and the dilution of that concentrate to prepare a coating bath to which the surfactant is added. Dilution of the concentrate is such that the bath comprises typically from about 5 to about 50 wt.% of the concentrate. However, it is expected that most applications will generally involve dilution of the concentrate in a manner such that the coating bath comprises about 10 to about 20 wt.% of the concentrate.

Prior to treating the metallic substrate with the coating composition, it should be cleaned. Particular care respecting cleaning should be exercised when the coating operation does not involve the application of an overlying coating to the coated substrate. Additional conventional pre-cleaning operations to remove dirt, grease, and any oxide films are necessary for optimum performance for this type of operation.

Although the present development can be used to particular advantage in an operation which involves the application of the coating composition with an applicator roll, the composition can also be applied by other methods. Exemplary methods are referred to in the aforementioned Schiffman and Davis patents. Application techniques known to the art include roll coating, reverse roll coating, dip, flow coating, spray and mist applications.

The use of the compositions of this invention require no rinse and produce no waste. Depending on the method of application, everything applied to the metal surface remains except the water that evaporates in drying. However, excess amounts of the treating composition can be removed by drip, spin or the like and re-used.

Depending on the metallic substrate being treated, coating weights of about 5 to about 100 mg/ft$^2$ can be formed. In operations involving aluminum and iron and the application of overlying coatings, optimum results are obtained with about 5 to about 50 mg/ft$^2$ of coating, with about 20 mg/ft$^2$ being preferred. With zinc surfaces such as galvanized iron, good results are obtained with coating weights of about 5 to about 50 mg/ft$^2$, but coating weights of about 10 to about 15 mg/ft$^2$ are preferred.

In operations which do not include the use of an overlying coating, coating weights of about 5 to about 100 mg/ft$^2$, preferably about 80 to about 100 mg/ft$^2$ should be formed.

EXAMPLES

Examples below are illustrative of the invention. Comparative examples are set forth also.

The first group of examples refers to a prior art composition of the type which, when applied by an applicator roll to a metallic surface, deposits excessive amounts of chromium on the roll. As mentioned above, the addition of various types of surfactants to such prior art compositions causes the compositions to destabilize. Destabilization is manifested by precipitation of resin solids in the composition. The first group of examples is also illustrative of this, but shows too, the use of an ether surfactant within the scope of the present invention and the stability of the composition containing it.

The basic prior art composition used in the first group of examples is described below.

| Constituent | g/l |
| --- | --- |
| CrO$_3$, formaldehyde-reduced, about 45 wt. % of the hexavalent chromium being in reduced form | 15.3 |
| acrylic resin solids (added as Rhoplex AC-73 latex) | 7.5 |
| phosphoric acid | 0.9 |

Each of the compositions referred to in Table I below includes the above constituents, and in addition, the surfactant identified in the Table and in an amount of about 1 g/l. It is noted that Table I includes the heading "% Conc." This refers to the active ingredient in the surfactant composition. For certain of the surfactants, the "HLB" (hydrophilic-lipophilic balance) is given, and for certain of the compositions, the surface tension is given. Surface tensions were measured on a Fisher tensiometer. The stability of each of the compositions was evaluated visually by observing whether or not resin precipitated from the composition. The composition of Example 1, which is illustrative of the invention, did not exhibit precipitation after two weeks from the time the surfactant was added to the composition. The comparative compositions which are characterized in Table I as "not stable" exhibited resin precipitation within the two-week period. It is known that the surfactants used in the compositions of Examples 1 and 1-C through 6-C are nonionic and that those in the compositions of Examples 7-C through 10-C are anionic.

TABLE I

| Ex. No. | Surfactant | % Conc. | HLB | Surface Tension dynes/cm | Stability |
| --- | --- | --- | --- | --- | --- |
| 1 | nonylphenolpolyglycol benzyl ether | 100 | 13.6 | 34.5 | Stable |
| 1-C | modified polyethoxylated straight chain alcohol (Triton *DF-12) | 100 | — | — | Not Stable |
| 2-C | ethoxylated nonylphenol having an average of 6 ethylene oxide units (Triton N-60) | 100 | 10.9 | — | Not Stable |
| 3-C | benzyl ether of octylphenylpolyethoxylate (Triton CF-10) | 100 | 14 | — | Not Stable |
| 4-C | modified terminated alkylaryl ether (Triton CF-87) | 90 | — | 35.8 | Not Stable |
| 5-C | aliphatic polyether (Antarox* LF-330) | 95 | — | — | Not Stable |
| 6-C | Antarox LF-222 | — | — | — | Not Stable |
| 7-C | free acid of complex organic phosphate ester (Gafac* PE-510) | 100 | — | — | Not Stable |
| 8-C | free acid of complex organic phosphate ester (Gafac RA-600) | 100 | — | — | Not Stable |
| 9-C | free acid of complex organic phosphate ester (Gafac RP-710) | 100 | — | — | Not Stable |
| 10-C | amine perfluoroalkyl sulfonate (Fluorad* FC-99) | 25 | — | — | Not Stable |
| 11-C | phosphate ester (Kronitex* KP-140) | — | — | 36.5 | Not Stable |

TABLE I-continued

| Ex. No. | Surfactant | % Conc. | HLB | Surface Tension dynes/cm | Stability |
|---|---|---|---|---|---|
| 12-C | phosphate ester (Kronitex TCP) | — | — | — | Not Stable |
| 13-C | phosphate ester (Kronitex 50) | — | — | — | Not Stable |

*Triton - trademark of Rohm & Haas Company;
Antarox - trademark of GAF Corp.;
Gafac - trademark of GAF Corp.;
Fluorad - trademark of 3M Co.;
Kronitex - trademark of FMC Corp. (the amounts of the active ingredients of Kronitex surfactants were not reported)

It should be appreciated that use of a surfactant which causes destabilization of the resin constituent of the composition is not satisfactory.

The next several examples show the use of surfactants of the present invention to correct chromium build-up problems that are experienced when using a prior art composition.

EXAMPLE 2

A coating composition alike in all respects to the basic prior art composition referred to in the first group of examples above, except that it contained about 6 g/l $CrO_3$, about 3 g/l of acrylic resin solids, and about 0.4 g/l of phosphoric acid was applied to an aluminum strip (3105 aluminum) on a 36″ line having a line speed of 120 ft./min. utilizing a rubber applicator roll that had a roll speed 10% greater than the line speed. After coating about 1 coil of the aluminum strip, a build-up of chromium and rubber was observed on the top metering roll of the roll coater, and chromium build-up was observed on the rubber applicator roll. The pattern of film of coating composition applied to the aluminum substrate was poor resulting in a coating that was not uniform and of marginal quality.

The rolls were cleaned by brushing the metering roll and sanding the rubber applicator roll. About 0.5 g/l of the ether surfactant identified in Example 1 above is added to the coating composition. After coating about 20 coils of aluminum, no chromium build-up was observed. The weight of the coating formed was about 9–11 mg/ft$^2$.

EXAMPLE 3

A coating operation similar to that described in Example 2, but involving the coating of hot-dip galvanized was run. Chromium build-up was encountered after coating about 1 coil of the galvanized strip. This caused excessive wear of the applicator roll and resulted in small bits of rubber being deposited on the strip and in the coating which rendered the coating unsuitable for use. About 0.5 g/l of the ether surfactant used in the composition of Example 2 above is added to the coating composition. Thereafter, excellent coatings were obtained with no build-up of chromium and rubber, and no evidence of applicator roll wear after operating for about 48 hours. The coated galvanized (coating weight about 10–12 mg/ft$^2$) was subsequently painted with a two-coat Sherwin Williams PVC system. The adhesive and corrosion-resistant standards expected of the painted and coated system were met.

The commercial availability of species of surfactant of the present invention has been noted above. The use of Triton CF-54, sold by Rohm & Haas Company, in the compositions and operations referred to in Examples 1, 2 and 3, gives the satisfactory results referred to therein. Triton CF-54 surfactant is described by Rohm & Haas as belonging to a class of compounds comprising alkylphenoxypolyethoxyethanol ethers containing 7–50 average number of oxyethylene group and an alkyl group containing 8–18 carbon atoms. Triton CF-54 is the subject of Rohm & Haas Technical Bulletin CS-412 (April 1979), and the Technical Bulletin "Triton Low-Foam Surfactants" CS-60 (May 1980), the disclosures of which are incorporated herein by reference. The latter publication refers to Triton CF-54 as a "modified polyethoxy adduct".

Another important advantage of the ether surfactant of the present invention is that its use has resulted in improvements in the adherent properties of coatings. By way of example, it is noted that in an application which involved the coating of an aluminum surface (3105 aluminum) using the prior art composition referred to above in the first group of examples, but modified by the addition thereto of about 1 g/l of Triton CF-54 surfactant, and the painting of the coated surface with Reliance single-coat polyester (0.8 mil film thickness), cold impact tests showed an improvement in paint adherency relative to the use of the unmodified prior art composition. (The tests involved cold impact at 34 inchpounds using a ⅝″ ball). The test results were "10% light" for the coating formed from the unmodified prior art compositions and "2% light" for the coating formed from the composition of the present invention.

Developmental work has shown that there are commercially available surfactants that do not cause destablization of the prior art composition referred to in the first group of examples. However, additional test work showed that compositions containing the surfactants formed coatings that had lower adherent properties than coatings formed from compositions including the ether surfactant of the present invention.

Indeed, in some cases, the surfactants adversely affected the adherent properties. The following surfactants were in this category: a nonionic polyethylene wax (40% conc.) sold by Rohm & Haas Co. under the trademark Poly-Em40; and a nonionic aliphatic polyether (95% conc.) sold by GAF Corp. under the trademark Antarox BL-330.

Equal or somewhat better adherent properties were possessed by coatings formed from compositions including the following surfactants: a nonionic aliphatic polyether (100% conc.) sold by GAF Corp. under the trademark Antarox BL-240 ("100% light"); and an octylphenoxypoly(ethoxy)ethanol (100% conc.), a nonionic surfactant sold by Rohm & Haas under the trademark Triton X-114 ("5% light").

Other tests have revealed that coatings formed from compositions within the scope of the present invention have better resistance to corrosion than coatings formed from prior art compositions. For example, this was demonstrated in coating hot-dipped galvanized which was subsequently painted with a primér (Atech Epoxy #5254-11) and a top coat (Atech Acrylic #1244-76). Other tests for corrosion resistance involving various aluminum surfaces and the use of a single coat of different paints, including polyester and acrylic paints, showed that coatings formed from compositions within the scope of the present invention had corrosion-resistant properties at least equal to those formed from prior art compositions.

It has been mentioned above that the dispersed resin solids which are a constituent of the coating composition are generally maintained in their dispersed salts through the use of a surfactant. As is well known, the presence of surfactant in a water-based composition has the effect of lowering the surface tension of the composition. (Pure water has a surface tension of 72 dynes/cm, but conventional latices which include surfactant to maintain the solid particles in dispersed state typically have a surface tension within the range of about 35 to about 50 dynes/cm, although latices having surface tensions outside of this range are also known). In one sense, the present invention relates to a modification of a prior art coating composition which has a surface tension below that of water by reducing its surface tension to an extent such that the build-up of chromium on a roll which is contacted with the composition is deterred to the extent that a coating process in which the composition is used is not affected adversely.

In summary, it can be stated that the present invention provides means for deterring or preventing the build-up of chromium on a roll which is used to apply to a metallic substrate a coating composition of the aforementioned type to thereby improve the quality of coatings formed from the composition. It should be appreciated that the present invention can be used to advantage also in applications which involve the use of rolls for squeegeeing purposes.

I claim:

1. In a coating composition of the type which is effective in forming on a metallic surface a corrosion-resistant coating and which comprises an acidic aqueous coating solution containing hexavalent chromium, reduced chromium and dispersed acrylic resin solids, and of the type which, when applied to a substrate by an applicator roll, tends to deposit on the roll excessive amounts of chromium, the improvement comprising inclusion in the composition of an alkylphenoxypoly(alkyleneoxy)ether surfactant in an amount sufficient to deter said excessive chromium build-up.

2. A composition according to claim 1 wherein the surfactant is nonylphenolpolyglycol benzyl ether.

3. A composition according to claim 1 or 2 including at least about 0.03 g/l of said surfactant.

4. A composition according to claim 1 or 2 including about 0.4 to about 7 g/l of said surfactant.

5. A composition for coating metal surfaces to enhance the corrosion resistance and paint adhesion properties thereof and comprising an acidic aqueous solution consisting essentially of at least about 1 g/l of hexavalent and formaldehyde-reduced chromium, about 40 to about 60 wt. percent of the chromium being in reduced form, at least about 0.06 g/l of phosphoric acid, at least about 0.03 g/l of alkylphenoxypoly(alkyleneoxy)ether surfactant and dispersed therein at least about 0.5 g/l of acrylic resin solids.

6. A composition according to claim 5 including about 10 to 50 g/l of hexavalent and formaldehyde-reduced chromium, about 0.06 to about 10 g/l of phosphoric acid, about 5 to about 25 g/l of acrylic resin solids and about 0.4 to about 7 g/l of surfactant.

7. A composition according to claim 6 including Triton CF-54 surfactant and Rhoplex AC-73 latex.

8. In a coating process in which a composition for coating a metallic surface is contacted with a roll, the coating composition being of the type which forms on the metallic surface a corrosion-resistant coating and comprising an acidic aqueous solution containing hexavalent chromium, reduced chromium and dispersed acrylic resin solids and having a predetermined surface tension below that of water, and also of the type which tends to deposit on the roll chromium in excessive amounts which tend to affect adversely the coating process, the improvement comprising using in the process said composition modified by having therein alkyl phenoxypoly(alkyleneoxy)ether surfactant in an amount which is sufficient to deter the deposit on the roll of said excessive chromium and which imparts to the composition a surface tension below said predetermined surface tension.

9. An aqueous concentrate such that an aqueous composition containing about 10 to about 20 wt.% of the concentrate consists essentially of the coating composition of claim 4.

10. An aqueous concentrate such that an aqueous composition containing about 10 to about 20 wt.% of the concentrate consists essentially of the coating composition of claim 1, 2, 5, 6 or 7.

11. A composition according to claim 1 wherein said alkylphenoxypoly(alkyleneoxy)ether is an alkylphenoxypoly(ethyleneoxy)ether.

12. A composition according to claim 11 including at least about 0.03 g/l of said surfactant.

13. A composition according to claim 11 including at least about 0.4 to about 7 g/l of said surfactant.

14. A process according to claim 8 wherein the surfactant is nonylphenolpolyglycol benzyl ether.

15. A process according to claim 8 or 14 wherein said composition includes at least about 0.03 g/l of said surfactant.

16. A process according to claim 8 or 14 wherein said composition includes about 0.4 to about 7 g/l of said surfactant.

17. In a coating composition of the type which is effective in forming on a metallic surface a corrosion-resistant coating and which comprises an acidic aqueous coating solution containing hexavalent chromium, reduced chromium and dispersed acrylic resin solids, and of the type which, when applied to a substrate by an applicator roll, tends to deposit on the roll excessive amounts of chromium, the improvement comprising inclusion in the composition of Triton CF-54 surfactant in an amount sufficient to deter said excessive chromium build-up.

18. A composition according to claim 17 including at least about 0.03 g/l of said surfactant.

19. A composition according to claim 17 including about 0.4 to about 7 g/l of said surfactant.

20. A composition for coating metal surfaces to enhance the corrosion resistance and paint adhesion properties thereof and comprising an acidic aqueous solution consisting essentially of at least about 1 g/l of hexavalent and formaldehyde-reduced chromium, about 40 to about 60 wt. percent of the chromium being in reduced form, at least about 0.06 g/l of phosphoric acid, at least about 0.03 g/l of Triton CF-54 surfactant and dispersed therein at least about 0.5 g/l of acrylic resin solids.

21. A composition according to claim 20 including about 10 to 50 g/l of hexavalent and formaldehyde-reduced chromium, about 0.06 to about 10 g/l of phosphoric acid, about 5 to about 25 g/l of acrylic resin solids and about 0.4 to about 7 g/l of surfactant.

22. A process for forming a coating on a metallic surface comprising contacting the surface with the coating composition of claim 1, 2, 5, 6, 7, 11, 12, 13, 17, 18, 19, 20 or 21.

23. A process according to claim 22 including applying said coating composition to said metallic surface with an applicator roll.

* * * * *